(12) United States Patent
Winkle et al.

(10) Patent No.: US 8,878,777 B2
(45) Date of Patent: Nov. 4, 2014

(54) CORNER CONTROL

(75) Inventors: Heather L. Winkle, Richmond, VA (US); Andrew Paulsen, San Jose, CA (US); Nicolas M. Hunter, Mountain House, CA (US)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 13/345,507

(22) Filed: Jan. 6, 2012

(65) Prior Publication Data

US 2013/0176201 A1   Jul. 11, 2013

(51) Int. Cl.
*G09G 5/00* (2006.01)
*G06F 3/041* (2006.01)

(52) U.S. Cl.
USPC .......................................... 345/156; 345/178

(58) Field of Classification Search
USPC .......... 345/173, 178, 156, 700; 715/702, 811, 715/821
See application file for complete search history.

(56) References Cited

U.S. PATENT DOCUMENTS

| 6,901,560 | B1 | 5/2005 | Guerlain et al. |
| 7,457,772 | B2 * | 11/2008 | Tabin ........................ 705/26.64 |
| 2011/0016390 | A1 * | 1/2011 | Oh et al. ....................... 715/702 |

* cited by examiner

*Primary Examiner* — Michael Faragalla
(74) *Attorney, Agent, or Firm* — Fish & Richardson P.C.

(57) ABSTRACT

Methods, program products, and systems for corner control are described. Each of the four corners of a rectangular display field can be individually configured to be a rounded corner or an angled corner. In some implementations, a method can include providing a user interface item for display. The user interface item can include four control elements. Each of the control elements can correspond to a corner of a display field. Each of the control elements can individually and independently control a shape of the corresponding corner of the display field. The display field can have one or more corners in rounded shape and one or more corners in angled shape, according to user input received through the user interface item.

21 Claims, 6 Drawing Sheets

CORNER CONTROL

TECHNICAL FIELD

This disclosure relates generally to data presentation.

BACKGROUND

A database application program can include tools for building a layout. The layout can be an arrangement of display fields representing how information is organized and presented. The display fields can be configured to present static or dynamic data including, for example, values, objects, or images. The layout can then be used to format data stored in, or referenced by, a database for presentation to a user. Typically, a display field is a rectangle. Some conventional database application programs provide options to configure display fields to have either four rounded corners or four angled corners to satisfy requirements from users having different aesthetic tastes.

SUMMARY

Methods, Methods, program products, and systems for corner control are described. Each of the four corners of a rectangular display field can be individually configured to be a rounded corner or an angled corner. In some implementations, a method can include providing a user interface item for display. The user interface item can include four control elements. Each of the control elements can correspond to a corner of a display field. Each of the control elements can individually and independently control a shape of the corresponding corner of the display field. The display field can have one or more corners in rounded shape and one or more corners in angled shape, according to user input received through the user interface item.

Particular embodiments of the subject matter described in this specification can be implemented to realize the following advantages. A system can give a user finer-grained control on what a display field looks like than a conventional system can. When the system combines multiple display fields, the resulting integrated display field can have a unified look and feel rather than an appearance of multiple individual elements combined. The system can thus make it easier for a user to design a user interface of a database application program. For example, the system can allow a user to easily design a table user interface element by joining first a rectangle having two rounded corners on the top and two angled corners on the bottom as a title bar of the table, a second rectangle having four angled corners as the main table cell of the table, and a third rectangle having two angled corners on the top and two angled corners on the bottom as a footer of the table.

The details of one or more implementations of corner control are set forth in the accompanying drawings and the description below. Other features, aspects, and advantages corner control will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
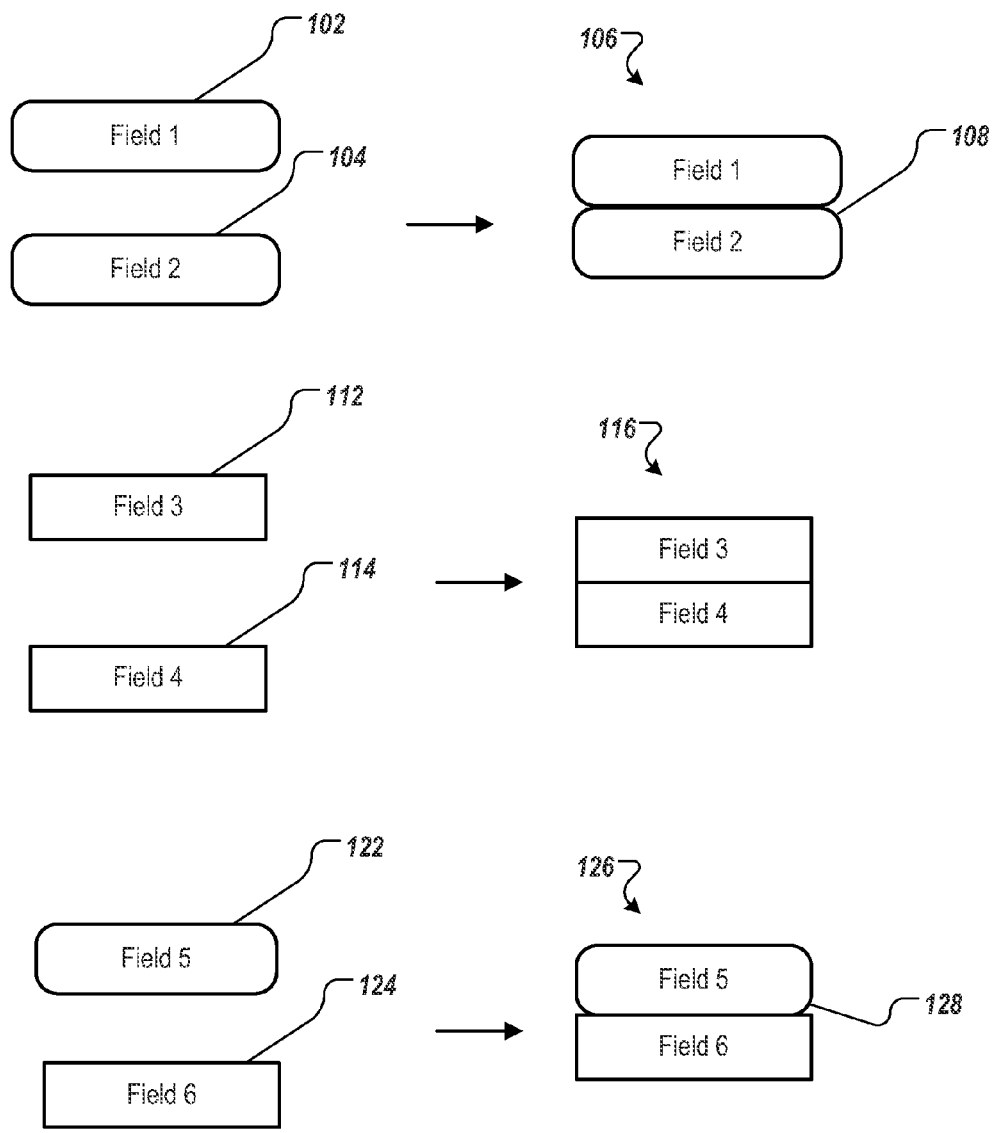
FIG. 1 illustrates an exemplary layout in a conventional database application system.

FIG. 1 illustrates an exemplary layout in a conventional database application system. The system can provide for display, in a layout editor, first display field 102 and second display field 104. According to a user specified display configuration, the system can display both first display field 102 and second display field 104 in rounded corners. The system can then receive an input indicating that first display field 102 and second display field 104 are to be displayed together. First display field 102 can be placed next to second display field 104 to provide an appearance of an integrated display field 106 that includes both first display field 102 and second display field 104. Because each of first display field 102 and second display field 104 has rounded corners, integrated display field 106 can include notch 108, which is formed by two rounded corners placed together. Notch 108 may not be aesthetically desirable to some users.

Alternatively, the system can provide for display, in a layout editor, third display field 112 and fourth display field 114. Each of third display field 112 and fourth display field 114 can have angled corners. When the system receives an input indicating that third display field 112 and fourth display field 114 are to be displayed together, the system can place third display field 112 next to fourth display field 114 to provide an appearance of an integrated display field 116. Because each of third display field 112 and fourth display field 114 has angled corners, integrated display field 116 does not include a notch as integrated display field 106 has. However, integrated display field 116 has angled corners, which may not be aesthetically desirable to some users.

Likewise, the system can provide, in a layout editor, fifth display field 122, which has rounded corner, and sixth display field 124, which has angled corners. Integrated display field 126 of fifth display field 122 and sixth display field 124 can include notch 128, which may not be desirable to some users.

Figure 2:
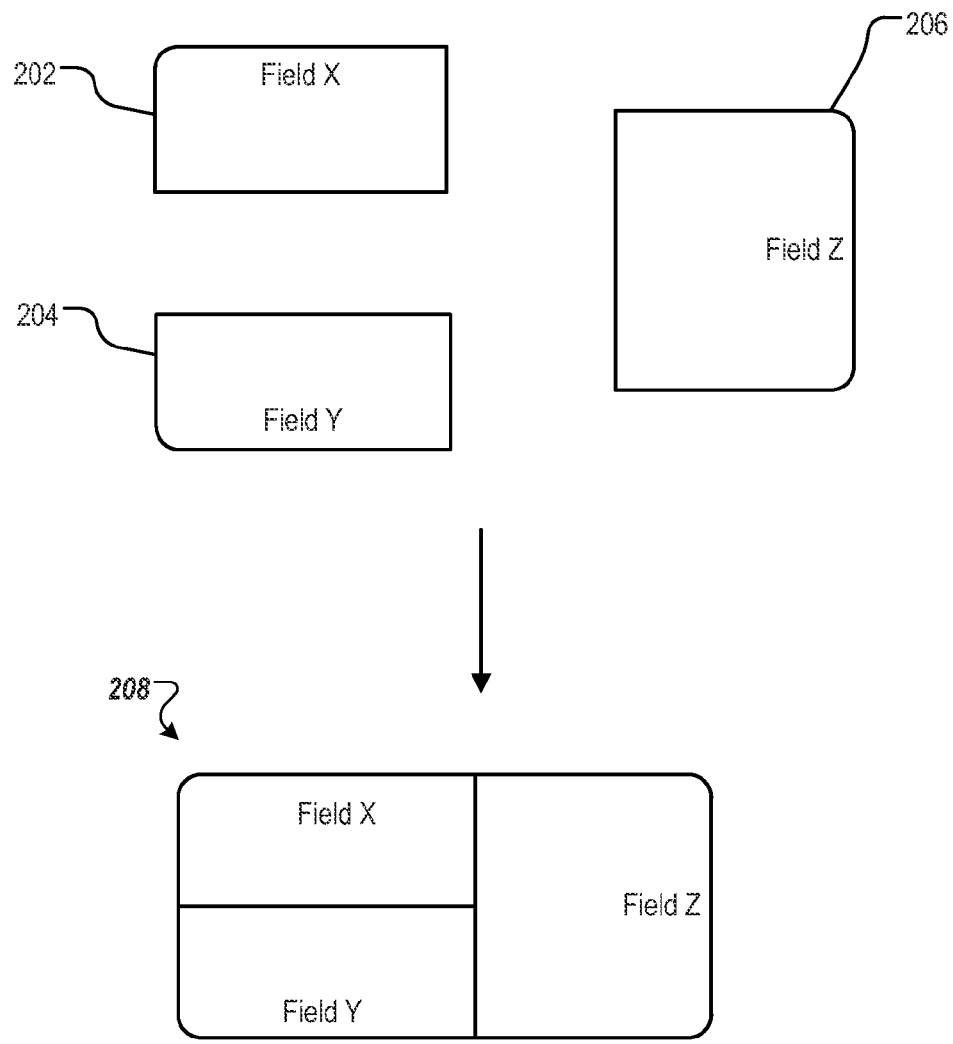
FIG. 2 illustrates an exemplary layout in a database application system with corner control.

FIG. 2 illustrates an exemplary layout in a database application system with corner control. The system can provide for display first display field 202, second display field 204, and third display field 206. Each of first display field 202, second display field 204, and third display field 206 can be a rectangle having four corners: upper left corner, upper right corner, bottom left corner, and bottom right corner. For each display field, each of the upper left corner, upper right corner, bottom left corner, and bottom right corner can be individually configurable, independent from configurations of other corners in a same rectangle. For example, one of the four corners can be a rounded corner, and another of the four corners can be a right-angled corner.

Based on one or more inputs, the system can configure first display field 202 to have a rounded upper left corner, whereas other corners of first display field 202 can be angled corners. The system can configure second display field 204 to have a rounded lower left corner, whereas other corners of second display field 204 can be angled corners. The system can configure third display field 206 to have a rounded upper right corner and a rounded lower right corner, whereas other corners of third display field 206 can be angled corners.

In some implementations, the system can receive a first input placing first display field 202 on top of second display field 204, and a second input placing third display field 206 to the right of first display field 202 on top of second display field 204. The system can place the display fields accordingly, to create an appearance of an integrated display field 208. Each of first display field 202, second display field 204, and third display field 206 can be individually controllable and configurable. For example, third display field 206 can have a different shade or fill pattern from first display field 202 and second display field 204.

In some implementations, the system can receive an input indicating that first display field 202, second display field 204, and third display field 206 are to be displayed together. The input can include, for example, a drag-and-drop action that drags a display field to a location that is within a threshold distance of another display field. In response, the system can create integrated display field 208. Integrated display field 208 can include four rounded corners. Additionally, integrated display field 208 can have smooth and straight edges that contain no notches. Each of first display field 202, second display field 204, and third display field 206 can be individually controllable and configurable. In addition, the system can configure integrated display field 208 as a whole. The system can provide a user interface item that allows a user to choose whether first display field 202, second display field 204, and third display field 206 are to be treated as individual display fields or as an integrated display field.

User Interfaces

Figure 3:
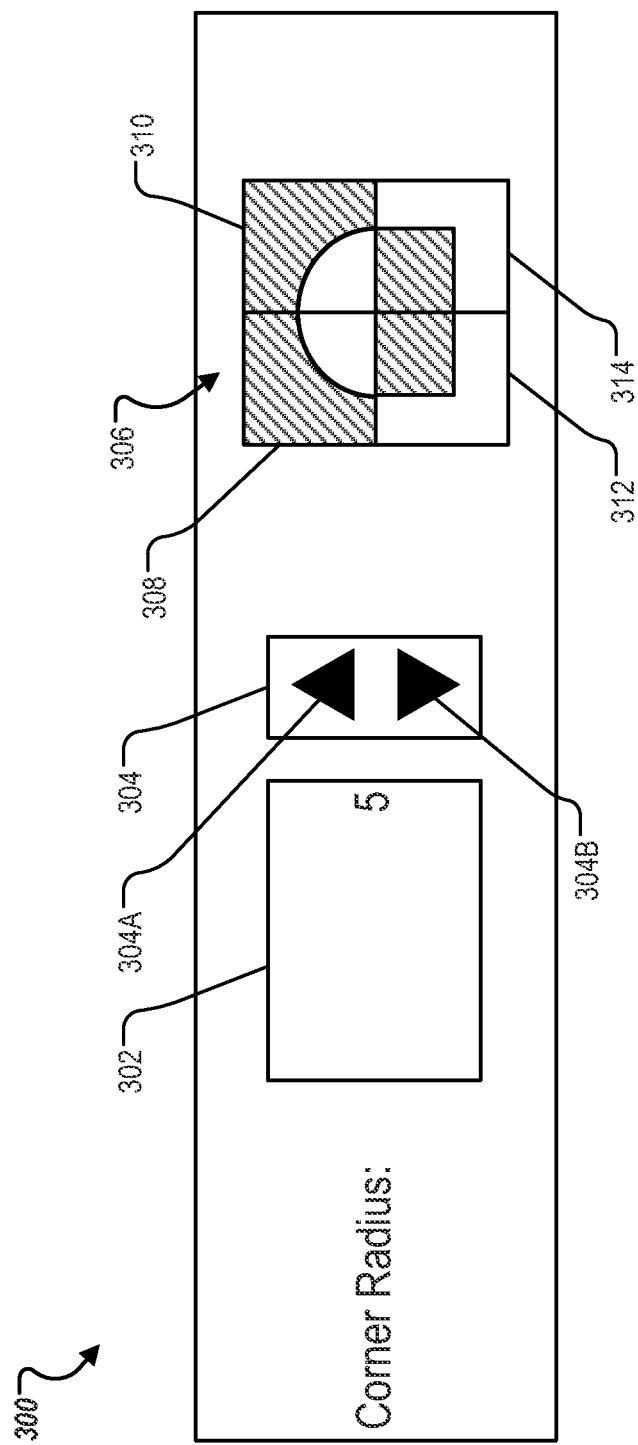
FIG. 3 is an exemplary user interface item for controlling corners.

FIG. 3 is exemplary user interface item 300 for controlling corners. A system that provides corner control functions can provide user interface item 300 for display in a user interface environment, e.g., a layout editor, where a display field can be configured. User interface item 300 can include corner radius configure item 302 and corner radius adjuster 304. Corner radius configure item 302 can be an input field configured to receive an input specifying a radius of a rounded corner. The rounded corner can be an upper left, an upper right, a lower left, or a lower right quadrant of a circle. The radius of a rounded corner can be the radius of the corresponding circle.

Corner radius adjuster 304 can include first element 304A and second element 304B. First element 304A and second element 304B can be configured to, upon receiving an input, increase or decrease a value of a radius in corner radius configure item 302, respectively. The system can specify a lower bound, an upper bound, or both, of the value of the radius. For example, a lower bound can be zero, where a rounded corner visually appears to be a right angle. An upper bound of the radius can be a ratio, e.g., 50 percent, of the lesser of a height or a width of a display field whose corners are being configured.

User interface item 300 can include corner selector 306. Corner selector 306 can be an interactive user interface item configured to receive an input indicating which, if any, corner of a display field is a rounded corner and which, if any, corner of a display field is an angled corner. Corner selector 306 can include four icons, icon 308, icon 310, icon 312, and icon 314 each of which corresponding to a corner of a rectangular display field. Each of icon 308, icon 310, icon 312, and icon 314 can be a tile in a grid having an upper left, an upper right, a lower left, and a lower right tile. The position of a tile in a grid can correspond to a corner located at a respective position of the display field. For example, icon 308, which is located in an upper left tile of the grid, can correspond to an upper left corner of a display field.

Each of icon 308, icon 310, icon 312, and icon 314 can have two states, indicating, respectively, that the corresponding corner is a rounded corner or an angled corner. Each of icon 308, icon 310, icon 312, and icon 314 can receive an input individually and independent for another of the icons. Upon receiving the input, an icon can toggle between the two states, and toggle the corresponding corner of the display field. In the example shown, icons 308 and 310 indicate that the upper left corner and upper right corner of a display field are rounded corners. Icons 312 and 314 can indicate that the lower left corner and lower right corner of the display field are right-angled corners.

In some implementations, an icon that indicates that a corresponding corner of a display field is a rounded corner can include a quarter of a circle that corresponds to the shape of corresponding corner. For example, icon 308 can have an upper left quarter of a circle. The radius of the circle can correspond to a value of the radius as specified in corner radius configure item 302. If corner radius configure item 302 specifies a value of a radius, e.g., in a number of pixels or a number of millimeters or inches, the radius for the quarter of the circle in icon 308 can be adjusted automatically to match the specified value or be set at a specified ratio (e.g., pre-specified) of the specified value.

Figure 4:
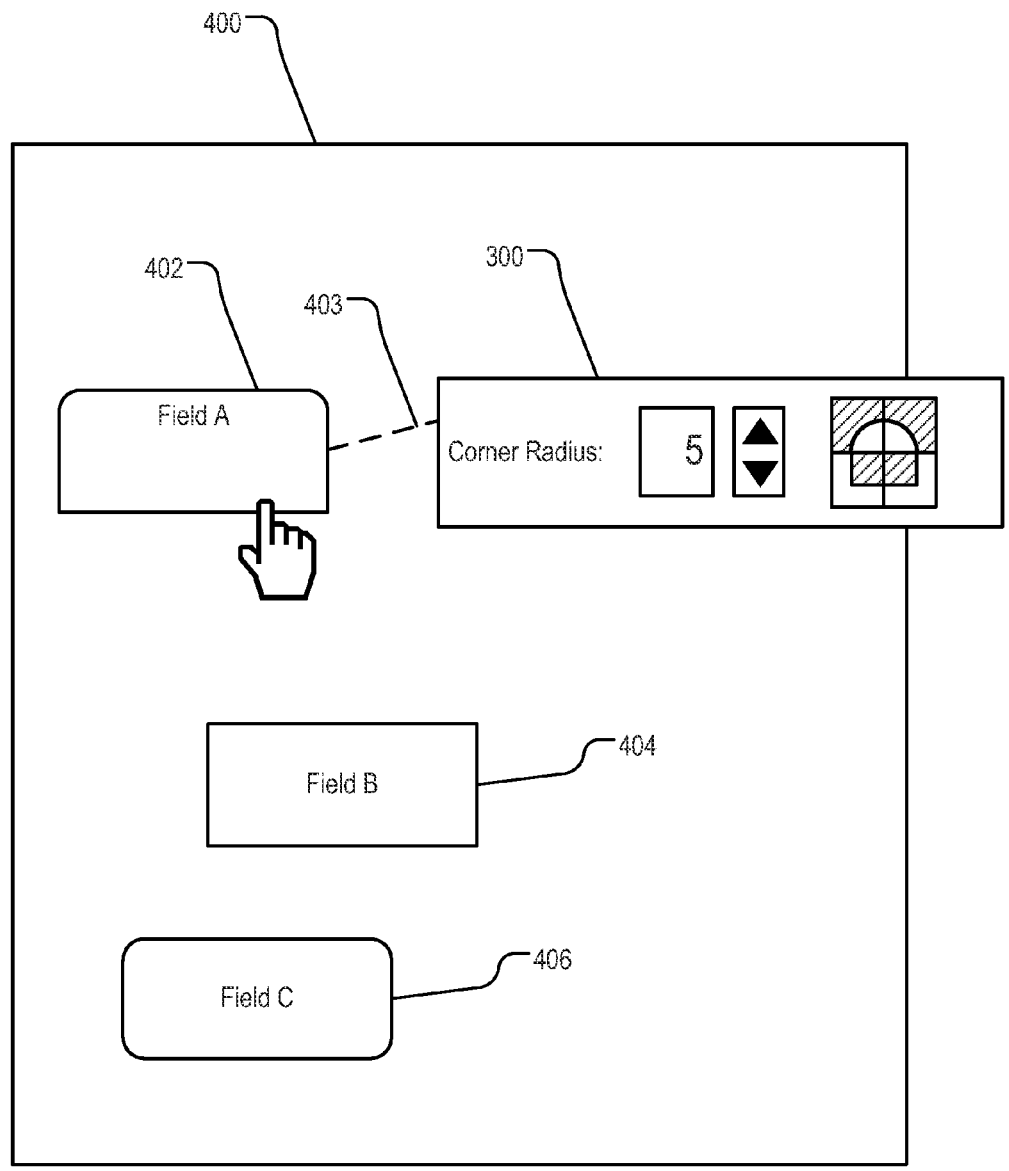
FIG. 4 is an exemplary user interface for controlling corners of a display field.

FIG. 4 is an exemplary user interface for controlling corners of a display field. The user interface can include editing window 400 for receiving edits of display fields 402, 404, and 406. A system having corner control functions can receive an input indicating that display field 402 is to be configured. The input can be a selection input, e.g., a mouth click, a touch input on a touch-sensitive screen, or a tab-over.

Upon receiving the input, the system can provide for display user interface item 300 as described above in reference to FIG. 3. User interface item 300 can be logically linked to display field 402, as indicated by dashed line 403. Accordingly, a change of corner radius or a selection of rounded or angled corners in user interface item 300 can affect only display field 402. For example, when user interface item 300 indicates that a top left corner and a top right corner are rounded corners, and that a bottom left corner and a bottom corner are angled corners, only display field 402 is configured accordingly.

In some implementations, the system can receive multiple selections of display fields before activating user interface item 300. For example, the system can receive one or more inputs of multiple selection selecting display fields 402, 404, and 406. The system can then logically link display fields 402, 404, and 406 to user interface item 300. A change of corner radius, or a selection of rounded or angled corner in user interface item 300, can affect a corresponding corner of every linked display field, including, for example, display fields 402, 404, and 406. Whether each corner of display fields 402, 404, and 406 is a rounded corner or an angled corner, and the radius of the corner if rounded, can be specified using a language for describing presentation semantics of a document, for example, a cascading style sheet (CSS). For example, the system can generate the following CSS code for drawing display field 402.

border-top-left-radius: 5pt;
    border-top-right-radius: 5pt;
    border-bottom-left-radius: 0pt;
    border-bottom-left-radius: 0pt;

where a border-top-left-radius can indicate a radius for a rounded corner at top left, measured by number of points or pixels. When the radius is zero point or pixels, the corresponding corner can be an angled corner. The system can enforce a rule that each of the four corners either have a same radius, e.g., "5pt," or zero.

Exemplary Corner Control Processes

Figure 5:
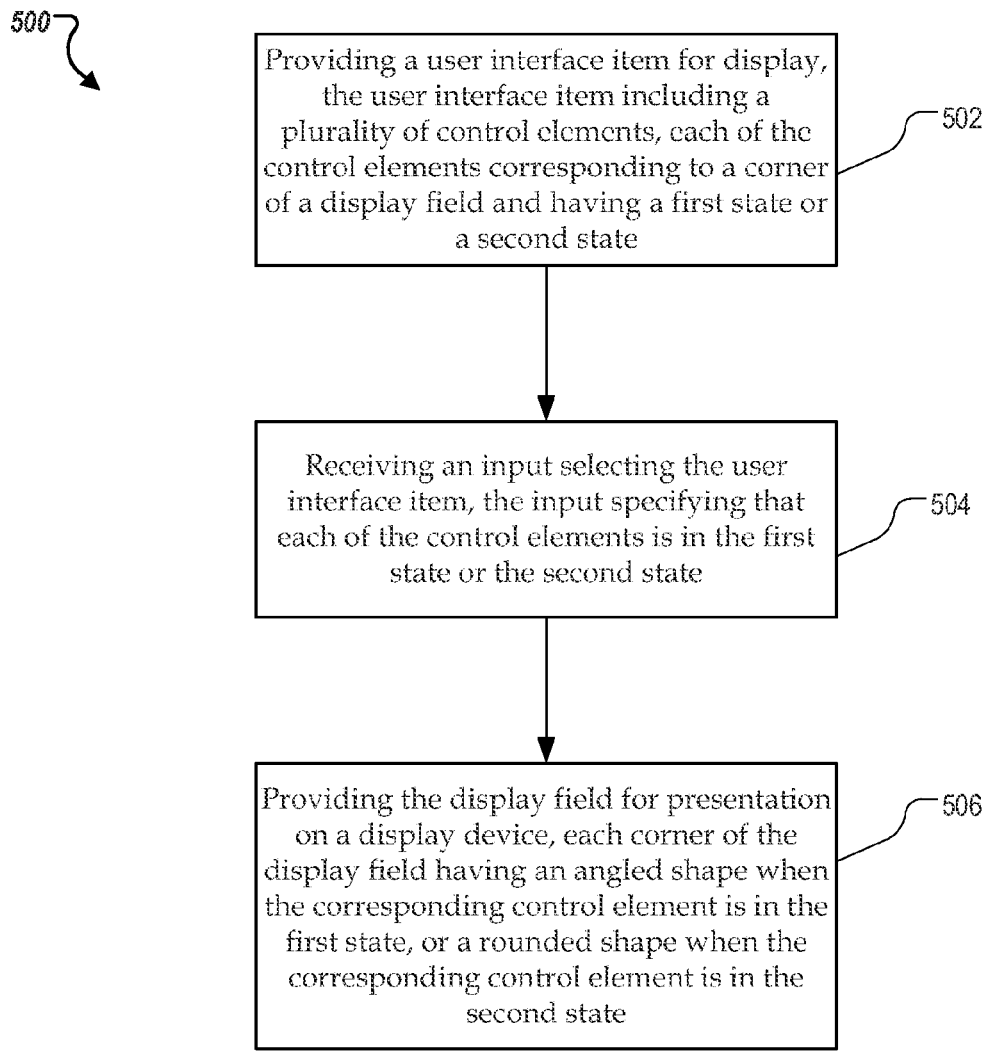
FIG. 5 is a flowchart illustrating an exemplary process of corner control.

FIG. 5 is a flowchart illustrating exemplary process 500 of corner control. A system having corner control functions can provide (502) a user interface item for display. The user interface item can be user interface item 300 as described above in reference to FIG. 3. The user interface item can include multiple control elements. Each of the control elements can correspond to a corner of a display field and have a first state or a second state. The first state can correspond to an angled shape. The second state can correspond to a rounded shape.

The control elements can be arranged as a grid of four tiled cells. A location of each control element in the grid, e.g., upper left, can indicate a location of the corresponding corner of the display field. Each control element can include an icon indicating the angled shape, or an icon indicating the rounded shape. The user interface item can include a radius control element that can receive input to specify a radius of each corner having the rounded shape. In some implementations, a control element corresponding to a rounded shape can change according to the radius. A change of values of the radius in the radius control element can cause a change of icons of the control element. The change of icons can correspond to the change of values.

The system can receive (504) an input selecting the user interface item. The input can specify that each of the control elements be in the first state or the second state. The input can be a click or a tap on the corresponding control element.

The system can provide (506) the display field for presentation on a display device. Each corner of the display field can have a first shape when the corresponding control element is in the first state, or a second shape when the corresponding control element is in the second state. The first shape can be an angled shape, including, for example, an angled line, angled double lines, or an angled bevel. The second shape can be a rounded shape, including, for example, a rounded line or rounded double lines.

In some implementations, the system can provide for display a second display field that is attached to the display field. The display field and the second display field can form a rectangle having rounded corners. Two corners of the display field and two corners of the second display can be in rounded shape. Two corners of the display field and two corners of the second display can be in angled shape. Accordingly, the rectangle can have no more than four corners in rounded shape.

The system can receive an input dragging and dropping the display field next to the second display field such that a distance between the display field and the second display field satisfies a threshold. The system can then automatically attach the display field and the second display field to form the rectangle having no more than four corners in rounded shape.

Exemplary System Architecture

Figure 6:
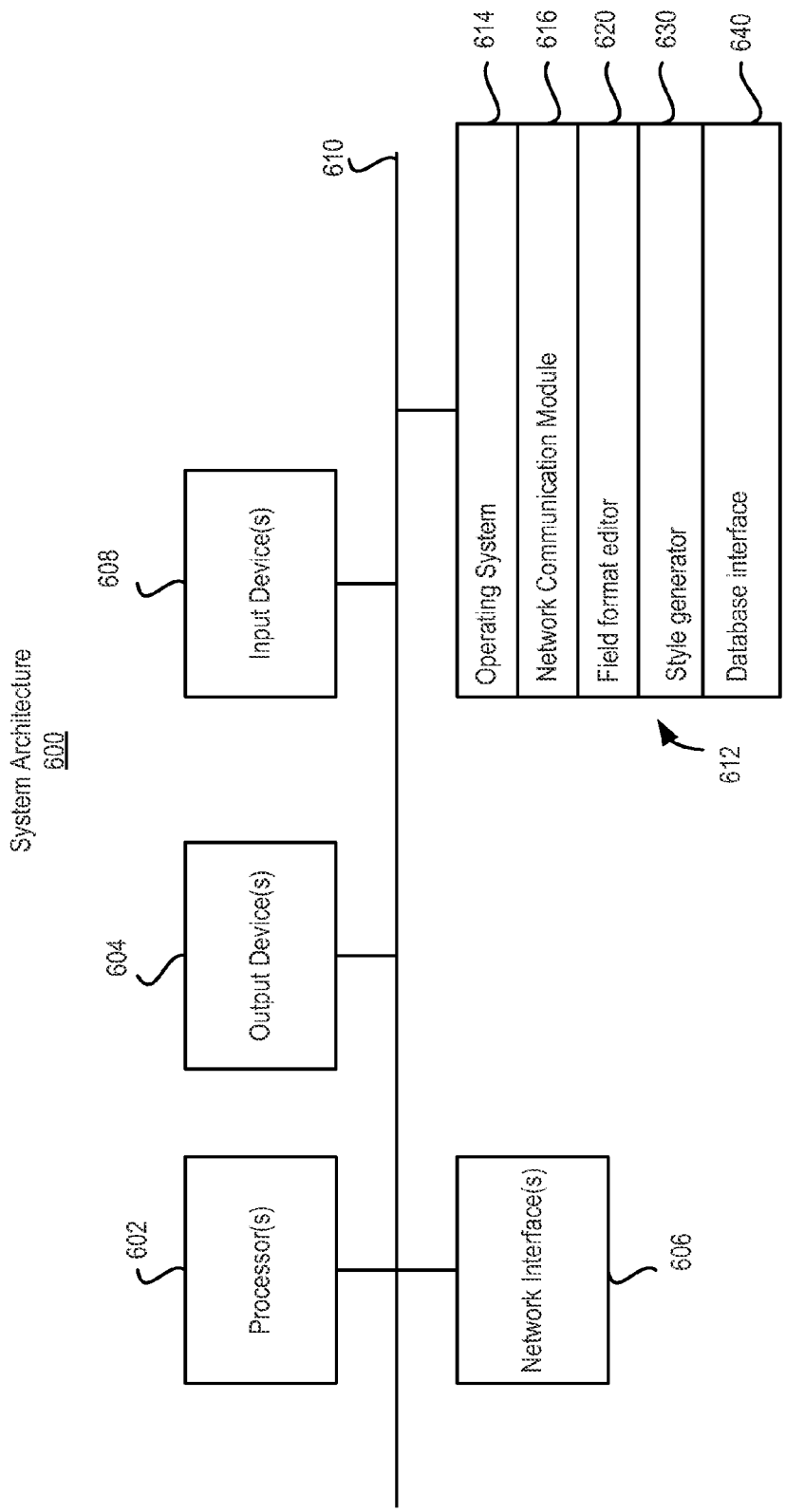
FIG. 6 is a block diagram of an exemplary system architecture for implementing the features and operations of FIGS. 1-5.

FIG. 6 is a block diagram of an exemplary system architecture 600 for implementing the features and operations of FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to a medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., a Linux® operating system), network communication module 616, field format editor 620, style generator 630, and database interface 640. Operating system 614 can be multi-user, multiprocessing, multitasking, multi-threading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.).

Field format editor 620 can include computer instructions that, when executed, cause processor 602 to display a user interface for editing format of a display field, including individually configuring each corner of the display field. For example, field format editor 620 can include a layout editor. Style generator 630 can include computer instructions that, when executed, cause processor 602 to generate code of language for describing presentation semantics of a document, e.g., CSS code. Database interface 640 can include one or more database interface elements for providing dynamic or static data stored in a database in the display field.

Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
    providing a user interface item for display, the user interface item including:
        a plurality of corner control elements, each of the corner control elements corresponding to a corner of a display field and having a first state or a second state, the first state corresponding to an angled shape, the second state corresponding to a rounded shape; and
        a radius control element operable to specify a radius of each corner having the rounded shape, the radius control element comprising an icon indicating the rounded shape, wherein a change of values of the radius in the radius control element causes a change of icons of the control element, the change of icons corresponding to the change of values;
    receiving an input selecting the user interface item, the input specifying that each of the control elements is in the first state or the second state; and
    providing the display field for presentation on a display device, each corner of the display field having the angled shape when the corresponding control element is in the first state, or the rounded shape when the corresponding control element is in the second state.

2. The method of claim 1, wherein the display field is a rectangle having at least one corner in the angled shape, and at least one corner in the rounded shape.

3. The method of claim 1, wherein the corner control elements are arranged as a grid of four tiled cells, a location of each corner control element in the grid indicating a location of a corresponding corner of the display field.

4. The method of claim 1, wherein each corner control element comprises an icon indicating the angled shape, or an icon indicating the rounded shape.

5. The method claim 1, wherein the user interface item is operable to cause a first corner of the display field to be displayed in the rounded shape and a second corner of the display field to be displayed in the angled shape.

6. A method comprising:
    providing a user interface item for display, the user interface item including a plurality of control elements, each of the control elements corresponding to a corner of a first display field and having a first state or a second state, the first state corresponding to an angled shape, the second state corresponding to a rounded shape;
    receiving an input selecting the user interface item, the input specifying that each of the control elements is in the first state or the second state;
    providing the first display field for presentation on a display device, each corner of the first display field having an angled shape when the corresponding control element is in a first state, or a rounded shape when the corresponding control element is in the second state; and
    providing for presentation a second display field that is attached to the first display field, the first display field and the second display field forming a rectangle, wherein:
        two corners of the first display field and two corners of the second display are in rounded shape, and
        two corners of the first display field and two corners of the second display are in angled shape, such that the rectangle has no more than four corners in rounded shape.

7. The method of claim 6, comprising:
    receiving an input dragging and dropping the display field next to the second display field such that a distance between the display field and the second display field satisfies a threshold; and then
    automatically attaching the display field and the second display field to form the rectangle having no more than four corners in rounded shape.

8. A non-transitory storage device storing instructions operable to cause one or more processors to perform operations comprising:
    providing a user interface item for display, the user interface item including:
        a plurality of corner control elements, each of the corner control elements corresponding to a corner of a display field and having a first state or a second state, the first state corresponding to an angled shape, the second state corresponding to a rounded shape; and
        a radius control element operable to specify a radius of each corner having the rounded shape, the radius control element comprising an icon indicating the rounded shape, wherein a change of values of the radius in the radius control element causes a change of icons of the control element, the change of icons corresponding to the change of values;
    receiving an input selecting the user interface item, the input specifying that each of the control elements is in the first state or the second state; and
    providing the display field for presentation on a display device, each corner of the display field having the angled shape when the corresponding control element is in the first state, or the rounded shape when the corresponding control element is in the second state.

9. The storage device of claim 8, wherein the display field is a rectangle having at least one corner in the angled shape, and at least one corner in the rounded shape.

10. The storage device of claim 8, wherein the corner control elements are arranged as a grid of four tiled cells, a location of each corner control element in the grid indicating a location of a corresponding corner of the display field.

11. The storage device of claim 8, wherein each corner control element comprises an icon indicating the angled shape, or an icon indicating the rounded shape.

12. The storage device claim 8, wherein the user interface item is operable to cause a first corner of the display field to be displayed in the rounded shape and a second corner of the display field to be displayed in the angled shape.

13. A non-transitory storage device storing instructions operable to cause one or more processors to perform operations comprising:
    providing a user interface item for display, the user interface item including a plurality of control elements, each of the control elements corresponding to a corner of a first display field and having a first state or a second state, the first state corresponding to an angled shape, the second state corresponding to a rounded shape;
    receiving an input selecting the user interface item, the input specifying that each of the control elements is in the first state or the second state;
    providing the first display field for presentation on a display device, each corner of the first display field having an angled shape when the corresponding control element is in a first state, or a rounded shape when the corresponding control element is in the second state; and
    providing for presentation a second display field that is attached to the first display field, the first display field and the second display field forming a rectangle, wherein:
        two corners of the first display field and two corners of the second display are in rounded shape, and
        two corners of the first display field and two corners of the second display are in angled shape, such that the rectangle has no more than four corners in rounded shape.

14. The storage device of claim 13, the operations comprising:
    receiving an input dragging and dropping the display field next to the second display field such that a distance between the display field and the second display field satisfies a threshold; and then
    automatically attaching the display field and the second display field to form the rectangle having no more than four corners in rounded shape.

15. A system comprising:
    one or more processors; and
    a non-transitory storage device storing instructions operable to cause the one or more processors to perform operations comprising:
        providing a user interface item for display, the user interface item including:
            a plurality of corner control elements, each of the corner control elements corresponding to a corner of a display field and having a first state or a second state, the first state corresponding to an angled shape, the second state corresponding to a rounded shape; and
            a radius control element operable to specify a radius of each corner having the rounded shape, the radius control element comprising an icon indicating the rounded shape, wherein a change of values of the radius in the radius control element causes a change of icons of the control element, the change of icons corresponding to the change of values;
        receiving an input selecting the user interface item, the input specifying that each of the control elements is in the first state or the second state; and providing the display field for presentation on a display device, each corner of the display field having the angled shape when the corresponding control element is in the first state, or the rounded shape when the corresponding control element is in the second state.

16. The system of claim 15, wherein the display field is a rectangle having at least one corner in the angled shape, and at least one corner in the rounded shape.

17. The system of claim 15, wherein the corner control elements are arranged as a grid of four tiled cells, a location of each corner control element in the grid indicating a location of a corresponding corner of the display field.

18. The system of claim 15, wherein each corner control element comprises an icon indicating the angled shape, or an icon indicating the rounded shape.

19. The system claim 15, wherein the user interface item is operable to cause a first corner of the display field to be displayed in the rounded shape and a second corner of the display field to be displayed in the angled shape.

20. A system comprising:
one or more processors; and
a non-transitory storage device storing instructions operable to cause the one or more processors to perform operations comprising:
providing a user interface item for display, the user interface item including a plurality of control elements, each of the control elements corresponding to a corner of a first display field and having a first state or a second state, the first state corresponding to an angled shape, the second state corresponding to a rounded shape;

receiving an input selecting the user interface item, the input specifying that each of the control elements is in the first state or the second state;

providing the first display field for presentation on a display device, each corner of the first display field having an angled shape when the corresponding control element is in a first state, or a rounded shape when the corresponding control element is in the second state; and providing for presentation a second display field that is attached to the first display field, the first display field and the second display field forming a rectangle, wherein:

two corners of the first display field and two corners of the second display are in rounded shape, and two corners of the first display field and two corners of the second display are in angled shape, such that the rectangle has no more than four corners in rounded shape.

21. The system of claim 20, the operations comprising:

receiving an input dragging and dropping the display field next to the second display field such that a distance between the display field and the second display field satisfies a threshold; and then automatically attaching the display field and the second display field to form the rectangle having no more than four corners in rounded shape.

* * * * *